May 17, 1960
E. A. ERICSON
2,937,254
PANELBOARD UNIT
Filed Feb. 5, 1957
4 Sheets-Sheet 1
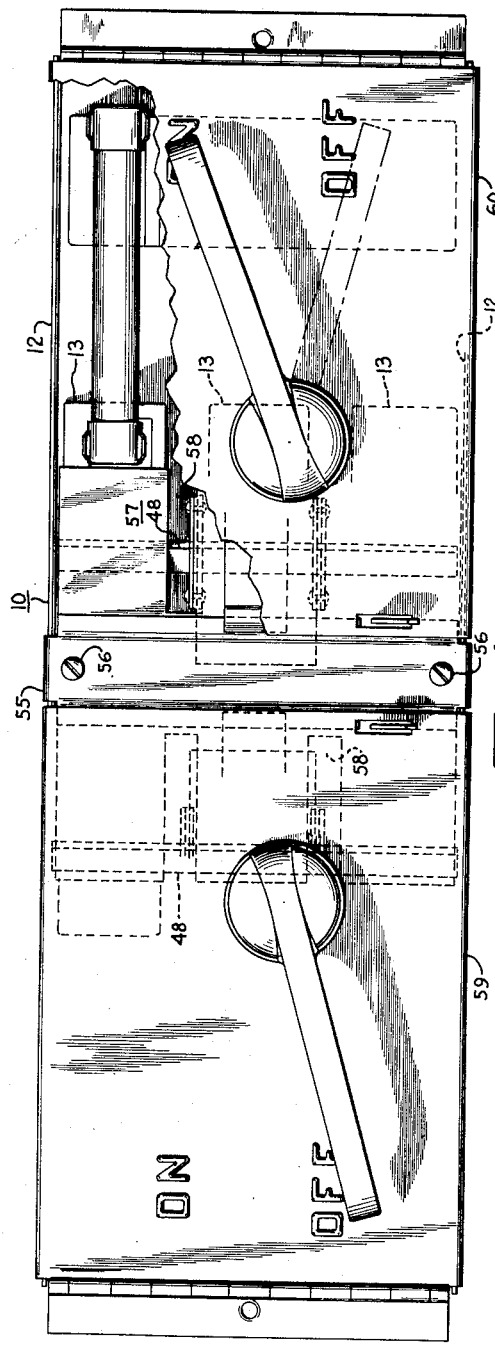
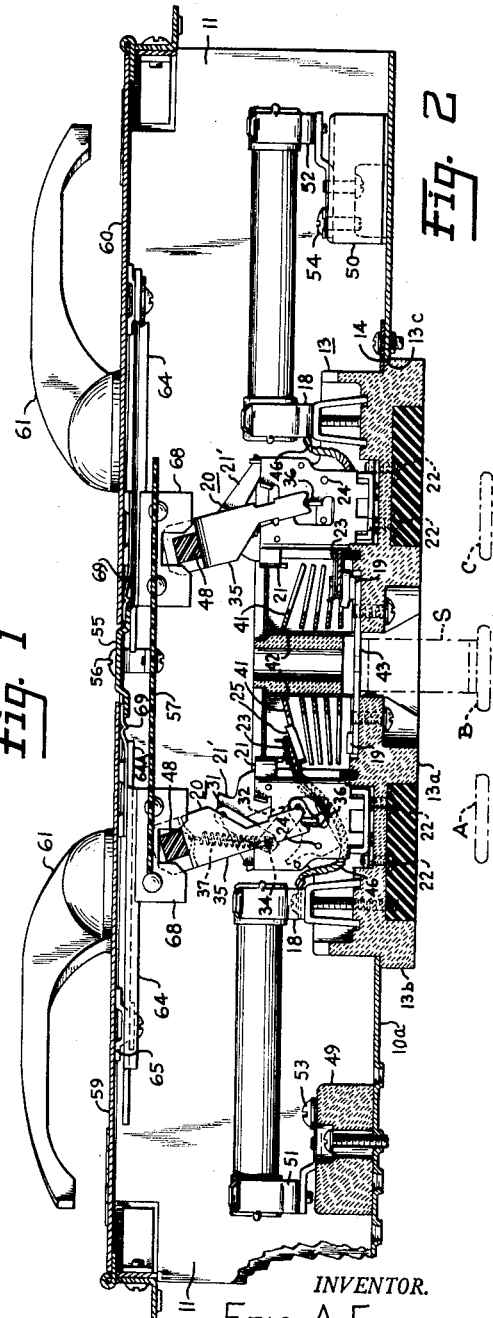
INVENTOR.
ERIC A. ERICSON
BY
Robert T. Casey
HIS ATTORNEY May 17, 1960
E. A. ERICSON
2,937,254
PANELBOARD UNIT
Filed Feb. 5, 1957
4 Sheets-Sheet 2
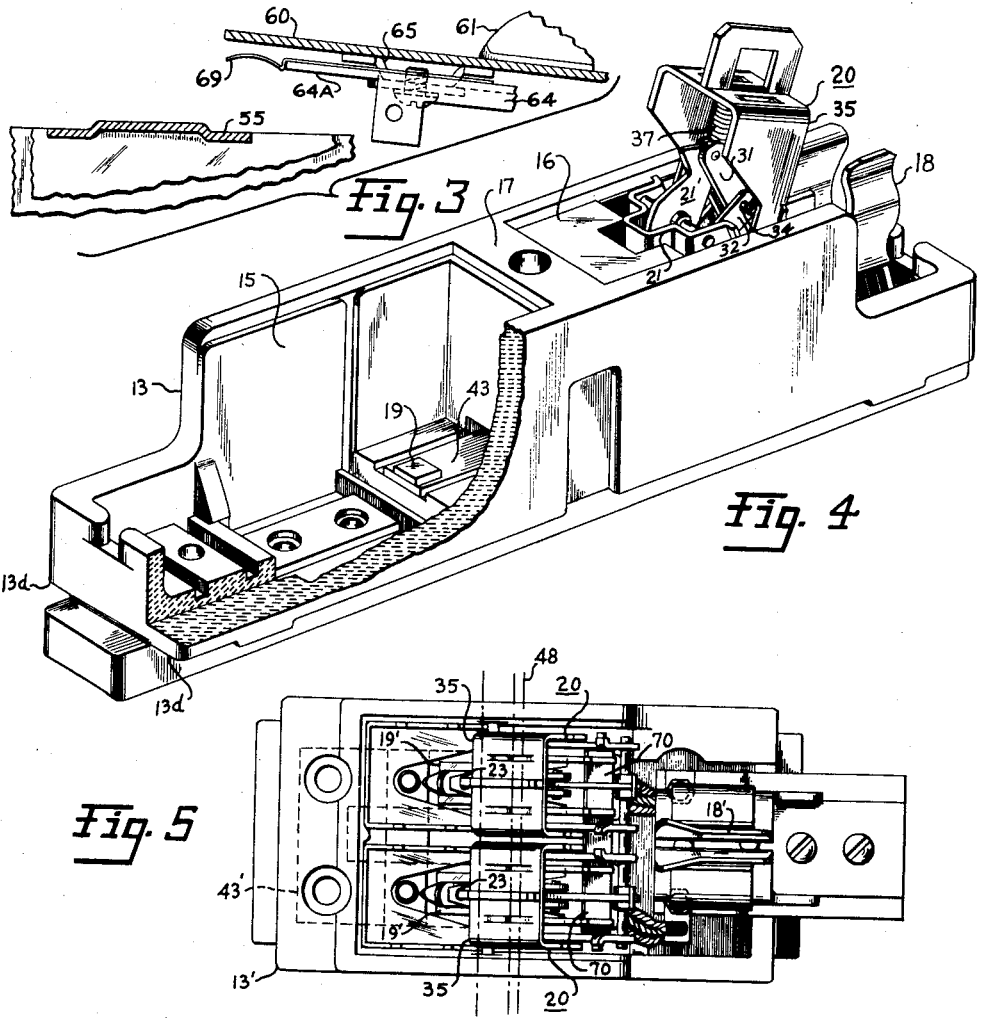
INVENTOR.
Eric A. Ericson
BY
Robert H. Casey
HIS ATTORNEY May 17, 1960     E. A. ERICSON     2,937,254
PANELBOARD UNIT Filed Feb. 5, 1957     4 Sheets-Sheet 3

INVENTOR.
ERIC A. ERICSON
BY
Robert A. Casey
HIS ATTORNEY

May 17, 1960  E. A. ERICSON  2,937,254
PANELBOARD UNIT
Filed Feb. 5, 1957  4 Sheets-Sheet 4

INVENTOR.
ERIC A. ERICSON
BY
*Robert F. Casey*
HIS ATTORNEY

United States Patent Office 2,937,254
Patented May 17, 1960

2,937,254

PANELBOARD UNIT

Eric A. Ericson, Plainville, Conn., assignor to General Electric Company, a corporation of New York Application February 5, 1957, Serial No. 638,371

5 Claims. (Cl. 200—114)

My invention relates to panelboard subassemblies or units and particularly to panelboard units of the switch and cartridge-fuse type, adapted to be mounted with other similar units within a larger enclosure to provide a panelboard.

Panelboard units of the switch and cartridge-fuse type in the past have been limited as regards their switching capacity. Such structures have also been relatively large and cumbersome, and the size and capacity thereof cannot readily be varied. Such switch structures are also basically of the slow-make, slow-break type, and considerable complication and expense is required to provide a mechanism suitable for use therewith adapted to give a quick-make, quick-break or snap action.

It is an object of my invention to provide a panelboard unit of the switch and cartridge-fuse type which includes switching means of the quick-make, quick-break or snap-acting type, which is extremely compact and efficient, and which has a high interrupting capacity.

It is another object of my invention to provide a panelboard unit of this type which can be readily manufactured in various sizes and capacities.

In accordance with my invention, I provide a panelboard unit including a number of separately housed self-contained switching devices of the snap-acting type, one for each pole or phase of a multiphase circuit, each being separately mounted and including its own operating member and arc extinguishing structure, all such devices being assembled in a common outer housing provided with means for operating all of such devices simultaneously from outside the housing.

In accordance with my invention in one form, I provide a plurality of individual insulating housings each containing two independent snap-acting switches in end-to-end relation having adjacent electrically common stationary contacts, the housings being mounted in side-by-side relation to form two rows of switches, the switches in each row being ganged together for common movement to provide two multipole snap-acting switches, and two separate operating means for operating such multipole switches from outside the unit housing.

In the drawings:

Figure 1 is a top plan view of a panelboard unit embodying my invention;

Figure 2 is a side elevation view of the unit of Figure 1, partly in section;

Figure 3 is a fragmentary view showing particularly the cover interlock arrangement used with the unit of Figure 1;

Figure 4 is a perspective view of one of the switch unit housings utilized in the invention of Figure 1, one switch mechanism being shown in place;

Figure 5 is a top plan view of a switching unit of increased capacity;

Figure 6 is a fragmentary perspective view of a portion of the manual operating mechanism of the panelboard unit of Figure 1;

Figure 7 is a detail view on enlarged scale of a portion of the operating mechanism shown in Figure 6;

Figure 13:
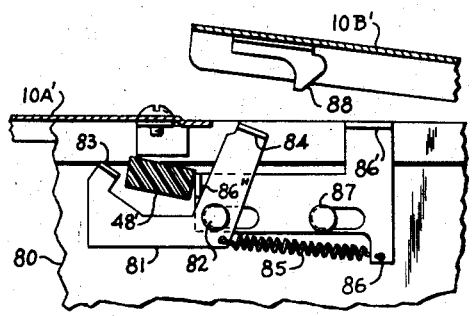
Figure 13 is a fragmentary view of the cover interlocking mechanism used in the embodiment of Figure 10.

Referring to the drawings and particularly to Figures 1–9, I have shown my invention as embodied in a panelboard unit having two 3-pole snap-acting switches and comprising a generally rectangular elongated outer enclosure 10 having open end walls 11 and closed side walls 12. Within the enclosure 10, I provide insulating switch housing means comprising three elongated generally rectangular insulating bodies 13. The enclosure 10 is provided with elongated generally rectangular openings in the back wall 10a, and each insulating body 13 includes a base portion 13a adapted to extend through one of these openings, substantially filling the opening and projecting a short distance beyond the back wall 10a. The base portion 13a includes a shoulder 13b adapted to underlie the back wall of the enclosure 10 at one end of the block 13, and a shoulder 13c adapted to be retained in mounted position by means of a locking tab 14 at the other end. The upper or main portion of the insulating body 13 is wider than the bottom portions 13a, thereby presenting shoulder 13d (Figure 4) adapted to rest on the inner surface of the back wall of the enclosure. The insulating body 13 is assembled from the interior of the enclosure by first inserting the shoulder 13b under the back wall, then setting the body flush on the back wall and locking it in place with tab 14.

Each of the insulating blocks 13 is provided with two end-to-end elongated generally rectangular recesses 15 and 16 (see Figure 4) extending down from the top and substantially completely from end-to-end thereof and separated from each other by a barrier portion 17. Each of the recesses 15 and 16 contains a fuse connector 18 at one end thereof and a relatively stationary contact 19 on the back wall of the recess at the other end thereof.

Also mounted in each of the recesses 15 and 16 between the fuse connector and the stationary contact, I provide a switch operating mechanism, of the snap-acting type, indicated generally at 20. Referring to Figure 2, each switch mechanism 20 includes a frame 21 mounted within the recess 15 by suitable means such as by rivets or screws 22. A switch arm 23 is mounted on a fixed pivot 24 in the frame 21 and carries a movable contact 25 adapted to engage and disengage the stationary contact 19. A pair of toggle links 31 and 32, interconnected by a knee pin 34, is provided between the switch arm 23 and fixed member 21'. The toggle links 31, 32 are each double members, comprising a link extending along each side of the relatively thin flat member 21'.

The operating mechanism further includes an operating member 35 pivoted on a fixed pivot 36 carried by the frame 21 and connected by a pair of tension springs 37 to the knee pin 34 of the toggle linkage. The springs 37 are adapted to be moved from one side to the other of the pin 34 as the operating member 35 is moved between "on" and "off" position. In the "on" position, the tension springs cause the toggle links 31 and 32 to move to a straightened position, thereby rotating the switch arm 23 in a clockwise direction and forcing the movable contact 25 into engagement with the stationary contact 19. When the operating member 35 is moved to the "off" position as shown in the left hand side of Figure 2, the tension springs 37 cause the toggle links 31 and 32 to move to the collapsed position, moving the switch arm 23 counterclockwise to the open circuit position.

In order to increase the interrupting ability and capacity of the switch assembly, I provide an arc extinguishing assembly including a plurality of spaced arc extinguishing plates 41 preferably of magnetic material, adapted to draw the arc therebetween and to cool and quickly extinguish it. The arc extinguishing plates 41 are carried by generally U-shaped insulating side wall members 42.

The stationary contacts 19 in the recesses 15 and 16 are mounted on opposite ends of a common terminal plate 43, and the insulating block 13 is provided with an aperture in its back wall adjacent the midpoint of the plate 43. Since the block 13 itself projects through the back wall 10a of the enclosure 10, connection may be readily made to the stationary contact 19 such as by a connecting strap S extending through the back wall of the enclosure 10. The relative position of main bus bars A, B and C is shown in dotted lines in Figure 2. The strap S is shown as connecting one plate 43 to bus bar B. Connection is similarly made between the other two plates 43 and the other bus bars A and C, by means of offset straps (not shown).

The movable contact 25 is connected by means of a suitable flexible conductor 46 to a fuse connector 18 positioned in the opposite end of the recess from the stationary contact 19.

For the purpose of making possible the simultaneous operation of the switch mechanisms 20 which are in side-by-side alignment within the enclosure 10 to provide two 3-pole snap-acting switches, I provide insulating tie bars or ganging means 48.

At opposite ends of the enclosure 10, I provide additional insulating bases 49 and 50 adapted to support additional fuse connectors 51 and 52 in alignment with the fuse connectors 18 carried by the block 13. The fuse connectors 51, 52 are connected to load terminal connectors 53 and 54, to which wires or cables leading to the loads to be controlled may be connected. For the purpose of permitting ready access to such terminals, the end walls 11 are preferably left open, it being understood that the enclosure 10 is to be mounted in a larger enclosure housing a complete panelboard.

For the purpose of shielding the mechanisms and contacts from possible contact through the open front of the enclosure 10, and for providing a cover interlock in a manner to be described, I provide a bridging member 55 adapted to be mounted across the central portion of the enclosure 10 by suitable means such as by screws 56 and carrying thereon an insulating shield 57 adapted to overlie all the arc chute chambers and mechanisms 20, including the handles 35 and ganging means 48.

The insulating blocks 13 are preferably spaced apart and the insulating shield 57 is provided with slot like openings 58 for the purpose of providing restricted access to the ganging members 48 for operation in a manner to be described. I further provide two partial covers 59 and 60 hinged across the end walls of the enclosure 10 and adapted to meet and partially overlap the central bridging member 55 to completely close the front of the enclosure 10.

For the purpose of permitting operation of the two multipole switch assemblies from outside the enclosure when the enclosure doors are closed, I provide operating mechanism including an operating handle 61 pivotally supported in each of the covers 59 and 60. Each operating handle 61 is anchored by means of bolts 61A to a plate 61B (see Figure 6) carrying an eccentric bolt 62 which in turn extends through slot 63 in a sliding plate 64. The movement of the plate 64 is further guided by members 65 carried by cover 59 and having an offset portion extending through slot 66. The plate 64 is also provided with depending bifurcated portions 68 which, when the covers 59 and 60 are closed, enter the slot-like openings 58 in the shields 57 and engage the tie bar 48, to operate the same between open and closed positions as the plates 64 slide back and forth in response to rotation of the handles 61 respectively.

The plates 64 are each provided with a forward extension 64A, which is adapted to extend under the bridging member 55 when the handle 61 and sliding plate 64 are in "on" position. This provides a safety interlock, making it impossible to open the covers 59 and 60 when the corresponding handle is in the "on" position.

The covers 59 and 60 are also provided with a second interlocking means comprising resilient strips 69 having a retaining hook portion adjacent the outer end thereof. When the covers 59 and 60 are in closed condition as in Figure 2, the ends of the strips 69 rest on flange portions of the bridging member 55 and the offset or hook portion is held out of the path of the plate 64. When the plate 64 is retracted to the "off" position and the door opened, the member 69 drops down to an interlocking position, as shown on enlarged scale in Figure 3. In this condition, the hook portion engages the end 64A of the plate 64 and prevents it from moving forward. This retains the handle 61 in "off" condition when the door is open, preventing any misalignment of the bifurcated portions 68 and the ganging bars 48.

Figure 9:
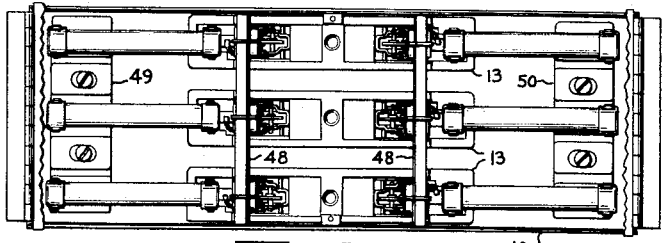
Figure 9 is a top plan view similar to Figure 1 but with the covers of the outer enclosure removed.

In Figure 9 I have shown a top plan view of a panelboard unit as shown in Figures 1 and 2, the top covers and bridging portion being removed to show the relative positions of the three insulating blocks and associated parts.

It will be observed that the length of the enclosure 10 and the spacing between the blocks 13 and the end blocks 49 and 50 may be varied to provide for accepting fuses of varying length.

In Figure 5 I have shown a modified form of my invention including an insulating body 13′ having a single enlarged recess therein adapted to receive and mount therein two switch operating mechanisms 20 in side-by-side relation. The contact arms 23 of each of the switch mechanisms 20 are connected in common to the fuse socket 18′ which socket is adapted to receive a cartridge fuse having a knife blade type terminal rather than a ferrule type terminal. The two stationary contacts 19′ are also connected electrically in common to a back terminal 43′. The contact arms 23 are supported on a common pivotal axis member 70 which is noncircular and which prevents appreciable movement of one contact arm without corresponding movement of the other. The operating members 35 are likewise ganged together by ganging means similar to ganging means 48 of Figures 1 and 2. Because of the double mechanism and contact arrangement provided and described, this unit is able to handle currents equal to twice the capacity of the units of Figures 1 and 2. Three of these units when ganged together in side-by-side relation similarly to the arrangement shown in Figures 1 and 2 provide a three-pole switch of correspondingly increased rating. By means of the common noncircular support of the switch contact arms common action of the arms is assured even if the operating springs of one mechanism should fail.

In Figures 8 and 10–14, I have shown my invention as embodied in an assembly adapted to handle substantially larger amounts of current, such, for instance as 400–600 amperes. In this form, a mechanism is provided of the same general type as the mechanism of the form of Figure 1 but including several important improvements whereby it is adapted to handle larger currents and to positively move the movable contact in case of contact welding.

This form is preferably constructed as a "single branch" unit, that is, the enclosure 10' contains only one set of three switch and fuse units. The enclosure 10' is however preferably made identical in length and height with the enclosure 10 of the form of Figures 1–9, so that both units may be mounted in the same panelboard assembly. Operating mechanism 20' comprises a supporting frame member 21' having enlarged apertures 75 in opposed portions of the side walls thereof. An operating member 35' is pivotally supported on a pivot pin 76 carried by the side frame 21'. Toggle links 31' and 32' are pivoted respectively in the side walls of the frame 21' at 33' and on the contact arm 23' and have their adjacent ends joined by a toggle knee pin 34'. An operating spring 71' is connected between the bight of the operating member 35' and the knee pin 34' of the toggle links. It will be observed that in this case the toggle links are pivoted directly to the side walls of the frame member 21' at 33' and that a single operating spring 71' is provided between the double sides of the toggle links. By means of this arrangement, the mechanism is simplified and a larger and heavier operating spring may be utilized.

Figure 12:
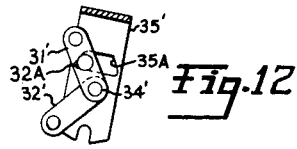
Figure 12 is a detail view of a portion of the switch operating mechanism of Figure 10.

The operating member 35' extends outside the supporting frame 21' and the side portions thereof are provided with apertures 35A (see Figures 12). The upper toggle links 31' are provided with pins 32A extending within the apertures 35A. The length of each aperture 35A is made slightly less than the total travel of the operating member 35' at the corresponding point. Accordingly, as the operating member 35' is moved toward "on" position, the pin 32A is picked up by the portion of member 35' at one end of the aperture 35A and if the operating spring has not passed over center, the operating member 35' forcibly moves the upper toggle links toward straightened or over set condition. Conversely, on return movement of the operating member toward "off" position, if the contacts have welded, or for some other reason the toggle spring does not provide enough force to initiate movement of the contact arm, the pin 32A will be picked up by the portion of member 35' at the other end of aperture 35A and be forcibly moved by the operating member 35'.

In this form of the invention, the enclosure 10' is provided with a two-part top wall, one part 10A' being relatively stationary and immovable, and the other part 10B' comprising a door hinged at the opposite end of the enclosure to provide access to the fuses. The operating handle 61' is preferably mounted on the stationary portion 10A' of the top wall.

Figure 14:
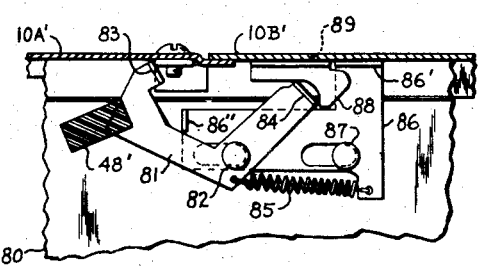
Figure 14 is a view similar to Figure 13 but showing the parts in interlocked condition.

In Figures 13 and 14 I have shown the form of cover interlock used for the embodiment of my invention shown in Figures 10 to 15. In accordance with this embodiment, an interlocking member 81 is provided pivotally suported on a pin 82 carried by the side 80 of the enclosure 10'. The member 81 is generally V-shaped and includes bent-over end portions 83 and 84 at opposite ends thereof. The end of the cross bar 48' is extended so as to terminate just short of the outer surface of the interlocking member 81. The end 83 however projects outwardly from the member 81 to a position where it normally interferes with the motion of the member 48'. When the cover 10B' is in closed position however a portion thereof strikes the end portion 84 of the interlocking member and rotates the member clockwise to the position shown in Figure 14. As shown in this position the offset end 83 has been moved out of the path of the ganging member 48' so as to permit movement of the member 48' to "on" position. A biasing spring 85 is provided which normally urges the interlocking member 81 counterclockwise to its interfering position as shown in Figure 13.

For the purpose of providing a cover interlock to prevent opening of the cover when the switch is in the "on" position and to permit opening of the cover when the switch is in the "off" position, I provide an interlocking member 86. The member 86 is slidably supported on the side wall 80 of the enclosure 10' on the pins 82 and 87. The biasing spring 85 is anchored to an extension of the interlocking member 86 so as to always bias the member 86 for movement to interlocking position (to the left as viewed in these figures). The cover 10B' is provided with an interlocking projection 88 having an undercut portion into which a portion 86' of the interlocking member 86 is adapted to extend when the member 86 is in interlocking position. When the switch is moved to the "on" position, the ganging member 48' is moved to the left, thereby permitting movement of the interlocking member to interlocking position under the influence of spring 85. When the switch is moved to the open circuit position, the member 48' moves to the right and strikes an offset portion 86'' carried by the interlocking member 86 thereby moving the interlocking member 86 to the right and releasing the cover. For the purpose of making the interlocking of the cover defeatable to permit inspection of the switch while in the "on" position, I provide an aperture 89 in the cover 10B' adjacent the side wall 80, and affording access to the offset portion 86' of the interlocking member 86. In order to open the cover when the switch is in the "on" position, it is only necessary to insert an instrument such as a screw driver in the opening 89 and push the interlocking member 86 to the right.

Figure 8:
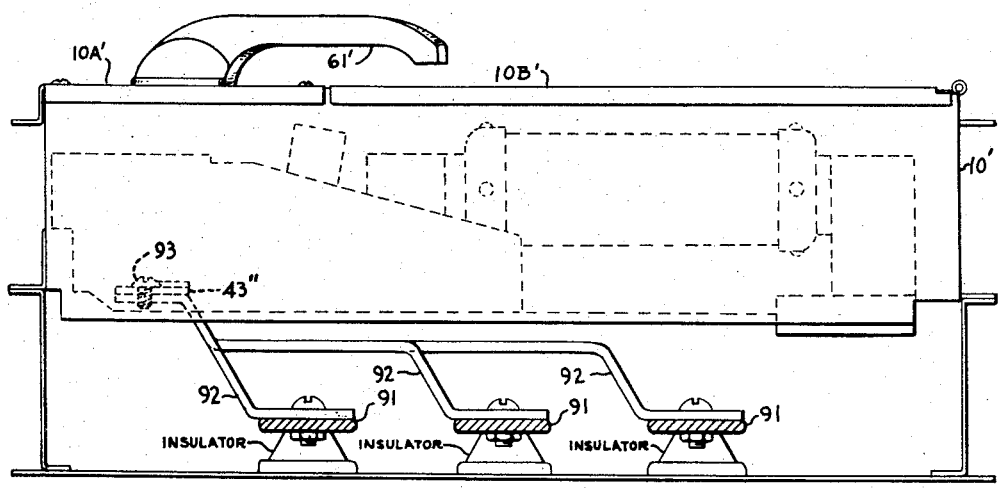
Figure 8 is a side elevation view of the embodiment of my invention shown in Figure 10.
Figure 10:
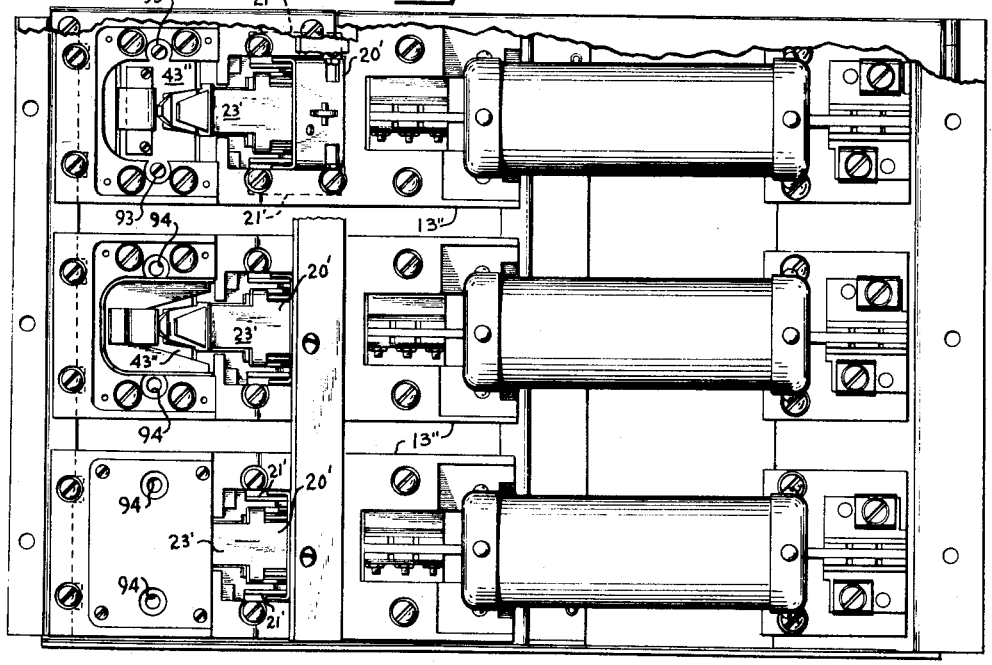
Figure 10 is a top plan view of another embodiment of my invention.
Figure 11:
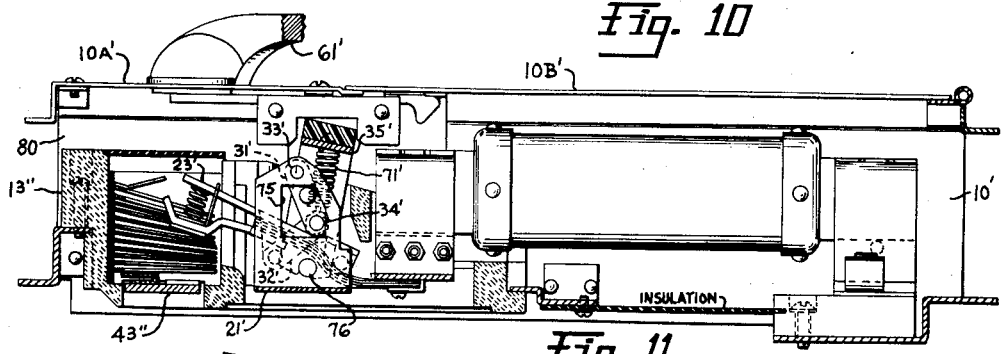
Figure 11 is a side elevation view partly in section of the embodiment of Figure 10.

In Figure 8 I have shown a cross section view of a panelboard unit such as shown in Figures 10 and 11 when mounted within an outer panelboard enclosure containing main power bus bars 91 and being connected thereto by offset straps 92. Each of the offset straps 92 is adapted to make connection with the strap 43'' of each of the three poles (see Figures 10 and 11). Connection is made between the plates 43'' and the connecting straps 92 by means of a bolt 93 which is inserted through suitable clearance openings 94 in the molded insulating body 13''.

Figure 15:
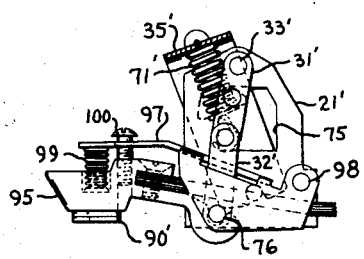
Figure 15 is a side elevation view, a modified form of the operating mechanism of Figure 11 shown in the circuit closed condition.
Figure 16:
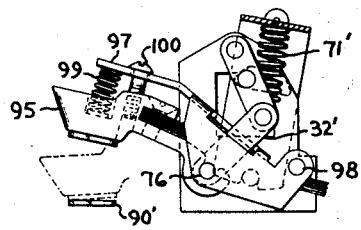
Figure 16 is a view similar to Figure 15, but with the mechanism shown in the circuit open position in full lines a portion thereof being shown in an intermediate position.

In Figures 15 and 16, I have shown a slightly modified form of the switching mechanism of Figure 11, like parts being indicated with like numerals. This form includes a heavy cast or machined contact member 95. A contact arm 97, generally similar to that of Figure 11, is provided, pivoted in the side frames on a stationary pivot 98 also as in Figure 11. The contact arm 97 includes a generally U-shaped intermediate portion having two slots cut therein adjacent the bight portion thereof to permit the passage of the lower toggle links 32'. In addition, a compression spring 99 is provided between the contact arm 97 and the contact member 95. In the position of Figure 15, the contact arm 97 is held in the position shown by means of the toggle links which are moved to the straightened position by the operating spring 71'. The compression spring 99 serves to transmit force from the contact arm 97 to the contact member 95, forcing it against the stationary contact 90'. Since the compression spring 99 is squarely behind the contact surfaces, it urges them into complete flatwise surface engagement. The contact member is provided with a certain freedom of movement with respect to the pivot point 76. The arrangement of the parts is such that when the contacts are in engagement as shown in Figure 15, the pin 76 is out of contact with the corresponding bearing surface at the back end of the contact member 95.

The contact arm 97 is connected by lost-motion connecting means to the contact member 95 by means of the headed screw 100 which passes through a clearance hole in the contact arm 97 and into threaded engagement with the contact member 95.

As the contact arm 97 moves toward circuit open position, the contact arm 97 comes in contact with the head of the screw 100 and the compression spring 99 forces the forward end of the contact member 95 downwardly causing it to tip slightly with respect to the contact surface 90'. The screw 100 may be adjusted to provide the optimum action in this respect. In Figure 16 there is shown in dotted lines the outline of the movable contact member 95 in the intermediate position as opening occurs. As indicated in this figure, the forward ends of the contacts are the last to part, thus causing arcing to occur at this portion of the contacts, and decreasing burning over the remaining area of the contacts.

It will be noted that the operating member 35' and the toggle links 31' are the same in this form as in the form of Figure 11, and therefore a "positive kick-off" action is also provided by this form of mechanism as described above in connection with Figure 11.

It will be seen that I have provided a fusible switch panelboard assembly which is extremely compact and which may be used in various combinations to provide for the various needs of such devices and which is highly effective and efficient. For instance, devices constructed in accordance with the present invention have been found to be capable of interrupting currents eight times as great as the minimum required for safe operation, and more than 15 times as great as full rated load current.

While I have shown only three embodiments of my invention, it will be appreciated that many modifications thereof will occur to those skilled in the art and I therefore intend by the appended claims to cover all such modifications as fall within the true spirit and scope of my invention.

What I claim as new and desire to secure by Letters Patent of the United States is:

1. A panelboard assembly comprising an elongated generally rectangular outer enclosure, a plurality of switching devices mounted within said outer enclosure in closely-spaced relation, each of said switching devices comprising an insulating base having a fuse connector at one end and a relatively stationary contact at the other end and a relatively movable contact adapted to move into and out of engagement with said relatively stationary contact and operating mechanism for operating said relatively movable contact comprising a frame member, a pivotally supported switch member, and a pair of toggle links between said frame member and an intermediate point on said switch operating member, a switch actuating means comprising a member pivoted on said frame, over center spring means connected between said actuating member and the knee of said toggle and adapted to move from one side to the other of the stationary pivot point of said toggle on said frame, to move said movable contact between open and closed positions with a snap action, said switch member and said toggle linkage each being pivotally connected to said frame by a fixed pivot to maintain said movable contact in closed position regardless of the magnitude of current passing through said switch, arc extinguishing means adjacent said relatively stationary contact comprising a plurality of spaced arc plates and an insulating block spaced apart from said switching devices and carrying a plurality of fuse connectors in alignment with the fuse connectors carried by said switching devices.

2. A fusible switch panel assembly comprising an elongated generally rectangular enclosure, a plurality of individual switching devices mounted in said enclosure in spaced apart relation, each of said switching devices comprising an insulating base mounted on the back wall of said enclosure, and having a recess therein, a fuse connector mounted within said recess at one end thereof, a relatively stationary contact mounted in said recess at the other end thereof, terminal means connected to said relatively stationary contact and accessible through the back wall of said enclosure, a plurality of fuse connectors mounted in alignment with said first fuse connectors on insulating means spaced apart from said first insulating bases, and switching means for moving said relatively movable contact into and out of engagement with said stationary contact and comprising a frame mounted on said switching base in said recess between said fuse connector and said relatively stationary contact, a switch arm pivotally supported on said frame and operably connected to said relatively movable contact, a pair of toggle links connected between an intermediate point of said switch arm and a point in said frame, said toggle linkage being adapted to be moved between collapsed and straightened positions to move said contact arm between open and closed circuit positions respectively, an operating member pivotally supported on said frame member and having a portion projecting above said recess for engagement by a manually operating means, spring means connected between a point on said operating member at one side of said stationary toggle pivot and the knee of said toggle linkage and adapted to move said toggle linkage between straightened and collapsed positions with a snap action, a flexible electrical conductor connecting said switch arm directly to said first fuse connectors, said switch member and said toggle linkage each being pivotally connected to said frame by a fixed pivot to maintain said movable contact in closed position regardless of the magnitude of current passing through said switch, arc extinguishing means adjacent said relatively stationary contact and comprising a plurality of spaced arc extinguishing plates, a hinged cover for closing the top wall of said outer enclosure, manually operable means carried by said hinged cover and adapted to engage with said ganging means to permit all of said individual switching devices to be operated substantially simultaneously by said outer manually operable member.

3. A panelboard assembly comprising an elongated generally rectangular enclosure, a plurality of individual switch bases mounted in spaced apart relation within said enclosure generally centrally thereof, each of said bases having at least two generally rectangular recesses therein each of said recesses having a fuse connector mounted therein at one end thereof and a relatively stationary contact mounted therein at the other end thereof, a movable contact in each of said recesses, switch operating mechanism within at least one of said recesses and comprising an over center toggle linkage type quick-make and break non-automatic mechanism, insulating ganging means connecting said movable contacts for common operation in two separate groups, and a plurality of fuse connectors mounted within said outer enclosure at opposite ends thereof and in alignment with the fuse connectors carried by said switch bases, a pair of covers for said enclosure hinged to the opposite end walls thereof and manually operable means carried by each of said covers and adapted to engage each of said ganging means when said cover is in closed position.

4. A fusible switch panelboard assembly comprising an elongated generally rectangular enclosure, insulating means mounted on the back wall of said enclosure substantially centrally thereof, said insulating means having a plurality of generally rectangular recesses in side-by-side relation each of said recesses containing a first fuse connector at one end thereof and a relatively stationary contact at the other end thereof, a relatively movable contact within said recess, a non-automatic switch operating mechanism mounted on said insulating means in at least one of said recesses and comprising a switch operating member pivotally supported on a fixed pivot within said recess and operably connected to said movable contact, a two link toggle connected between an intermediate point of said switch arm and a fixed pivot, switch operating means pivotally supported on a fixed pivot within said recess, spring means connecting the swingable end of said operating member to the knee of said toggle linkage whereby said toggle linkage is moved between straightened and collapsed positions as said operating member is moved about its pivot, arc extinguishing means within said recess adjacent said stationary contact, a fuse connector supported in insulated relation in said enclosure in alignment with and spaced away from said first fuse connectors, a flexible electrical conductor connecting each said movable contact to a corresponding one of said first fuse connectors, hinged cover means hingedly supported at one edge of said enclosure and carrying manually operable means, switch ganging means connecting the operating members of all switching mechanisms in said side-by-side recesses together for operation substantially as a unit, and electrical connecting means accessible through the back wall of said enclosure for connection to each of said relatively stationary contacts.

5. A fusible switch panelboard assembly comprising an elongated generally rectangular outer enclosure having end walls and side walls, insulating means mounted on the back wall of said enclosure substantially midway between said end walls, a plurality of elongated generally rectangular recesses in side-by-side alignment in said insulating means each of said major recesses being divided midway between its ends to provide a pair of aligned minor recesses, each of said minor recesses containing a fuse connector at one end and a relatively stationary contact at the other end, and switch operating means in said recess between said fuse connector and said stationary contact and comprising an over center toggle operated switch member and an operating handle member insulating means ganging the operating handle members of all side-by-side aligned switch mechanisms together for operation substantially as a unit, insulating cover means covering each of said mechanisms to prevent accidental contact from the front wall of said enclosure, the covers for each switch mechanism being spaced apart to provide a slot therebetween, hinged cover means for said enclosure comprising a pair of covers hinged to the opposite end walls thereof and manually operable means carried by each of said covers and adapted to engage said ganging means by means extending through said slots.

References Cited in the file of this patent

UNITED STATES PATENTS

| | | |
|---|---|---|
| 1,232,412 | Van Valkenburg | July 3, 1917 |
| 1,539,851 | Krantz | June 2, 1925 |
| 1,565,470 | Krantz | Dec. 15, 1925 |
| 1,757,742 | Sachs | May 6, 1930 |
| 1,780,895 | Kellner | Nov. 4, 1930 |
| 1,786,797 | Von Hoorn | Dec. 30, 1930 |
| 1,794,901 | Jennings | Mar. 3, 1931 |
| 2,100,749 | Randall | Nov. 30, 1937 |
| 2,191,615 | Frank et al. | Feb. 27, 1940 |
| 2,315,633 | May | Apr. 6, 1943 |
| 2,343,323 | Pierce | Mar. 7, 1944 |
| 2,347,528 | Weiser | Apr. 25, 1944 |
| 2,383,296 | Dorfman | Aug. 21, 1945 |
| 2,402,173 | Malone | June 18, 1946 |
| 2,404,183 | Landmeier | July 16, 1946 |
| 2,419,125 | Dorfman et al. | Apr. 15, 1947 |
| 2,555,331 | Grady | June 5, 1951 |
| 2,789,169 | Duvall et al. | Apr. 16, 1957 |
| 2,821,596 | Bires et al. | Jan. 28, 1958 |
| 2,832,860 | Matthias | Apr. 29, 1958 |
| 2,840,652 | Eichelberger et al. | June 24, 1958 |
| 2,849,572 | Cellerini | Aug. 26, 1958 |